United States Patent [19]

Steipe et al.

[11] Patent Number: 4,729,046
[45] Date of Patent: Mar. 1, 1988

[54] CASSETTE TAPE RECORDER

[75] Inventors: Leo Steipe; Johannes Starke, both of Munich, Fed. Rep. of Germany

[73] Assignee: Feinwerk Electronik GmbH, Munich, Fed. Rep. of Germany

[21] Appl. No.: 772,895

[22] Filed: Sep. 5, 1985

[30] Foreign Application Priority Data

Sep. 6, 1984 [DE] Fed. Rep. of Germany ....... 3432831

[51] Int. Cl.⁴ ............................................. G11B 15/18
[52] U.S. Cl. .................................... 360/94; 360/96.3; 360/105; 242/200
[58] Field of Search ................ 360/94, 96.3, 105, 93, 360/96.1; 242/197–200

[56] References Cited

U.S. PATENT DOCUMENTS

| 3,666,207 | 5/1972 | Swain | 360/94 |
| 4,216,509 | 8/1980 | Sato et al. | 360/94 |
| 4,490,757 | 12/1984 | Mogi | 242/200 |
| 4,573,091 | 2/1986 | Barton, Jr. et al. | 360/105 |

FOREIGN PATENT DOCUMENTS

| 3234854 | 5/1983 | Fed. Rep. of Germany | 360/94 |
| 60-40545 | 3/1985 | Japan | 360/96.3 |

Primary Examiner—John H. Wolff
Assistant Examiner—Matthew J. Bussan
Attorney, Agent, or Firm—Paul L. Sjoquist

[57] ABSTRACT

The cassette tape recorder for the four common types of cassettes according to German Industrial Standards DIN 32 715 T, 32 715 W, and the so-called micro-cassette as well as the mini-M-cassette comprises three sound head carriers (10, 20, 30) adapted to be moved selectively into operating position. Furthermore, the spacing between winding shafts (2,2') is adjustable by a movable cam disc (17). This adjustment is taken care of by cam disc engaging fixtures (23, 33) at the movable sound head carriers (20 and 30, respectively) and by a spring (18) holding the cam disc (17) in an inoperative position against a stop. Likewise provided are adjustable winding heads (3,3') causing different engagement members (4,6) to become effective for the winding drive, the adjustment of the winding heads (3,3') also being effected upon moving of the sound head carriers (10,20,30). Scanning members serve to scan a geometric dimension of the cassette and based on that scanning the spacing of the winding shafts (2,2'), the position of one of the sound heads (14,35,60) and, if desired, adjustment of the winding heads (3,3') and their engagement members (4,6) are determined.

24 Claims, 20 Drawing Figures

CASSETTE TAPE RECORDER

FIELD OF THE INVENTION

The instant invention relates to a cassette tape recorder, comprising two winding shafts movably disposed at variable spacing and each including engaging fixtures for winding drums of the casssettes, further comprising at least one electromagnetic sound head disposed at a predetermined position with respect to the winding shafts

BACKGROUND OF THE INVENTION

The invention deals with the problem of different types of sound recording tape cassettes being available which are not compatible. In the field of dictating machines alone four different types of cassettes have become common lately. They are:

1. the so-called Grundig cassette according to German Industrial Standard DIN 32 750 T,
2. the mini-cassette according to DIN 32 750 W,
3. the micro-cassette, and
4. the mini-M-cassette.

These cassettes differ in many respects. Their dimensions are different as well as their reel cores, the spacing between cores, and the centering means, and finally also the provision of "scanning windows" for sound, playback, and erasing heads. As a result of these differences the various cassettes can be used only in tape recorders designed specifically for their employment. Once a user has decided to adopt a certain system, he will be bound to continue to make use of it unless he is willing to replace the whole system, putting up with the economic loss involved.

In greater firms or clerical offices different systems are bound to clash, and then dictating and playback sets must be available for each system. That is uneconomical. DE-OS No. 32 34 584 discloses a cassette tape recorder which includes two winding shafts arranged at variable spacing for adaptation to different cassettes. The winding shafts are guided by arcuate slots formed in a plate which receives the cassettes and are displaced along the path defined by these slots. Before any change of the type of cassette the proper spacing must be adjusted between the winding shafts, a cumbersome affair for unskilled users. If they forget to make the adjustment, the cassettes or the tape recorder may become damaged.

SUMMARY OF THE INVENTION

It is, therefore, an object of the instant invention to provide a cassette tape recorder of the kind specified initially which will adapt automatically to different types of cassettes.

This object is met, in accordance with the invention, in that the at least one sound head is movable between given limit positions, in that a scanning member is provided to scan a geometric dimension of the respective cassette, and in that the mutual spacing of the winding shafts and the position of the at least one sound head are variable in response to this scanning.

Advantageous modifications and further developments of the invention may be gathered from the subclaims.

The tape recorder according to the invention also is easy to handle because all that needs to be done is to insert the cassette. Thereupon all other driving and scanning conditions become adjusted automatically in response to the respective width of the cassette.

The apparatus according to the invention substantially must fulfill the following functions:

1. It must be possible to adjust different axial spacings for the cassette drives (winding shafts). This is obtained in supporting the winding shafts so as to be displaceable (pivotable) and to be adjusted to the respective axial spacing required by means of a control cam.

2. To be able to drive different winding cores by a single shaft, the latter is so designed that its diameter corresponds to the smallest cassettes and that engaging fixtures are provided at the circumference for mini-cassettes. The shaft has excess length so that an engaging fixture for the other two types of cassettes may be placed on the upper part thereof, this engaging fixture including the equipment of the mini-cassette cores at its inside or being approximated to the same. The respective arrangement needed for a certain cassette then may be entered into engagement by mutual displacement of the winding shaft and of the winding head in longitudinal direction. In a preferred embodiment this is effected by a cam-controlled rocker which displaces the winding shaft and the winding head with respect to each other 3. The scanning members (recording, playback, and, if desired, erasing heads) are to be adapted to the respective types of cassettes as well as any possible arresting means for the cassettes. A preferred embodiment, therefore, comprises three sound head carriers which are pivoted into operating position, as required.

BRIEF DESCRIPTION OF THE DRAWING

The invention will be described further, by way of example, with reference to the accompanying drawings, in which.

DESCRIPTION OF THE PREFERRED EMBODIMENTS

Figure 1A:
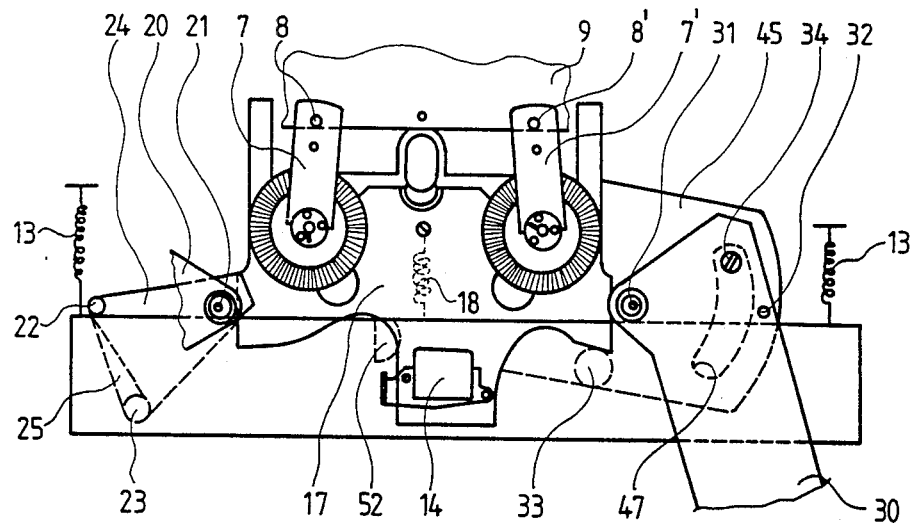
FIG. 1A is a diagrammatic top plan view of the cassette tape recorder according to the invention in a first operating position.

Throughout the figures like reference numerals designate like parts.

For the sake of clarity the drawing shows only the essential functioning members to the extent that they are needed to understand the respective figure.

Figure 1B:
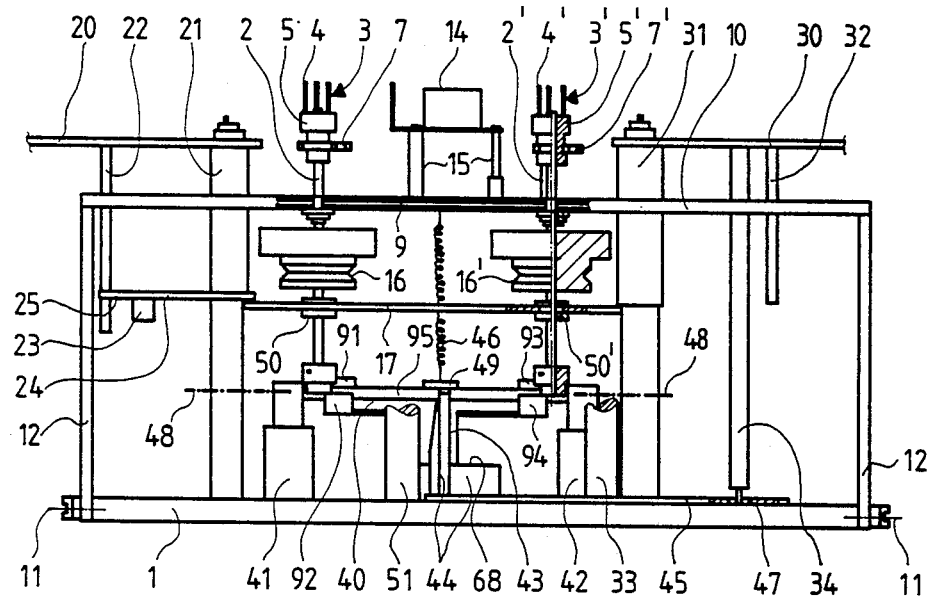
FIG. 1B is a diagrammatic front elevational view of the tape recorder in the operating position shown in FIG. 1A.
Figure 2A:
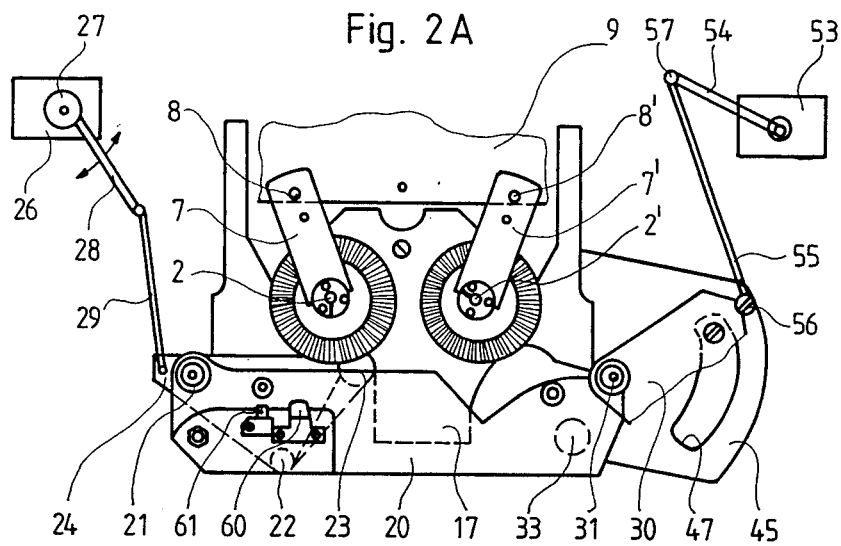
FIG. 2A is a diagrammatic top plan view of the cassette tape recorder according to the invention in a second operating position.
Figure 2B:
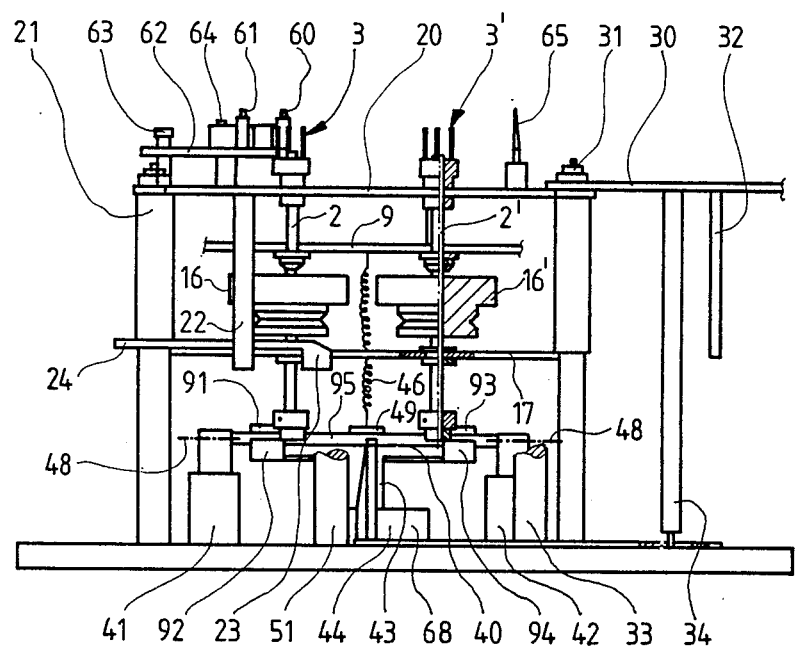
FIG. 2B is a diagrammatic front elevational view of the tape recorder in the operating position shown in FIG. 2A.
Figure 3A:
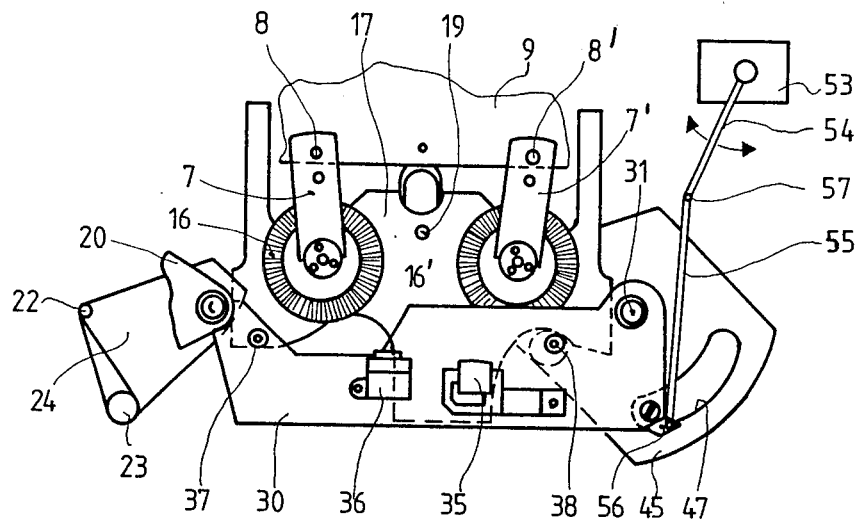
FIG. 3A is a diagrammatic top plan view of the cassette tape recorder according to the invention in a third operating position.
Figure 3B:
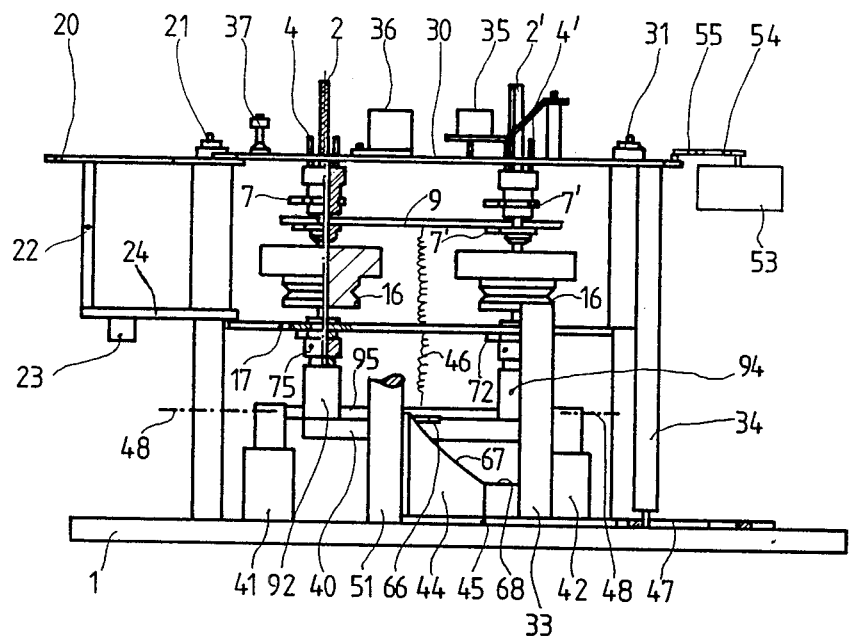
FIG. 3B is a diagrammatic front elevational view of the tape recorder in the operating position shown in FIG. 3A.

The cassette tape recorder shown in FIGS. 1 to 3 comprises a base plate 1 serving as the carrier of the entire tape recorder. The tape recorder comprises two winding shafts 2, 2' which are spaced from each other and adapted to be driven by an electric motor (not shown) and (rubber) drive belts by way of a belt pulley each 16 and 16', respectively. At their ends the winding shafts carry displaceable or reversible winding heads 3, 3' which in the present case each include three engaging pins 4 uniformly distributed along the circumference and projecting vertically upwardly from a carrier 5 or 5', respectively, to enter into engagement with corresponding projections or webs provided at the winding drum of the tape cassette. The carrier 5 or 5' is supported for axial displacement on the winding shaft 2 or 2' and secured for rotation by a groove and tongue joint 6 (cf. FIG. 5C). The groove and tongue joint 6 at the same time serves to carry along the winding drum of tape cassettes of different structure. The adjustment in height of the carrier 5 is effected by means of a displaceable engaging plate 7 or 7' which slides along a guide pin 8 or 8' secured to a stationary carrier plate 9. The guide pins 8 and 8', respectively, at the same time serve as pivot axes of the winding shafts 2 and 2', respectively, whereby their mutual spacing is variable.

The tape recorder comprises three separate sound head carriers 10, 20, and 30 of which only a respective one will perform duty. They may change their relative position with respect to the winding shafts 2 and 2', a change which is effected by pivoting motion in the embodiment shown.

FIG. 1 shows the sound head carrier 10 in operating position, while the sound head carriers 20 and 30 are swung outwardly and thus not ready for service. The sound head carrier 10 is pivotable about a pivot axis 11 which extends parallel to the base plate 1. To this end the sound carrier 10 is fixed by two lateral carrier arms 12 to pivot bearings at the base plate 1 (pivot axis 11). The carrier arms 12 are engaged by tension springs 13 which pull the sound head carrier 10 into its upwardly swung operating position. The other ends of the tension springs 13 are kept stationary.

Here the sound head carrier 10 carries a sound head 14 which here is fixed to the sound head carrier 10 by means of supporting legs 15.

In the embodiment shown FIG. 1 represents the operating position for the so-called Grundig cassette according to German Industrial Standard DIN 32 750 T. The sound head 14 accordingly is a so-called "AWL" head, a head for recording, playback, and erasing.

The winding mandrel used in the cassette mentioned is a cup which carries the winding on the outside and comprises a hub at the inside including three spokes or webs. The engaging pins 4 and 4' thus serve for the rotational drive of this cassette so that the winding head 3 or 3' is in its raised position (cf. FIG. 5A) at which the pins 4 and 4' extend beyond the winding shafts 2 and 2'.

The other two sound head carriers 20 and 30 are fixed to vertically upright pivot axes 21 and 31, respectively, on the base plate 1 and may be pivoted into operating position, if required. Preferably this is done by an electric motor drive.

As explained in greater detail with reference to FIGS. 2 and 3, the following must be carried out when the sound head carriers 20 and 30 are swung into position:

The sound head carrier 10 must be pivoted out of the way and this is effected by engaging fixtures 22 or 32 projecting vertically downwardly from the sound head carriers 20 and 30 and abutting against the front edge of the sound head carrier 10 oriented toward the winding shafts.

Furthermore, the axial spacing of the winding shafts must be changed. To this end the winding shafts 2 and 2' are positively guided at a cam disc 17 (cf. FIG. 6) and this cam disc is adjusted by cam disc engaging fixtures 23 and 33 which are coupled to the sound head carriers 20 and 30, respectively. The cam disc 17 is biased in one direction by a tension spring 18 such that the cam disc 17 will be in a position as required for the operating position upon use of the sound head carrier 10 in order to establish the spacing between the winding shafts 2 and 2' needed with this operative position. In the embodiment shown the cam disc engaging fixture 33 serves as stop for the cam disc 17 when the sound head carrier 30 is in the outwardly pivoted position.

Finally, also the winding head 3 or 3' and/or the winding shaft 2 or 2' also must be displaced, if required. In the embodiment shown this is effected only when the sound head carrier 30 is used and, therefore, it will be described in greater detail with reference to FIGS. 3 and 5. It should merely be mentioned here that the adjustment of the winding heads 3 and 3' or of the winding shafts 2 and 2' is carried out by a rocker 40 tiltable about an axis 48 which extends parallel to the base plate 1 and is supported in two bearing columns 41 and 42 fixed on the base plate 1 The rocker 40 or a scanning tongue 43 of the rocker 40 slides along a shift cam 44 disposed vertically with respect to the base plate 1 and fixed on a rotary plate 45 which is coupled positively with the sound head carrier 30 and, therefore, follows the rotation of the latter whereby the shift cam 44 is adjusted. The rocker 40 furthermore is biased by a tension spring 46 into a position at which the engaging pins 4 project beyond the upper end of the winding shaft 2, namely the position shown in FIG. 5A.

For adjusting the mutual spacing between the winding shafts 2 and 2', the cam disc 17 is guided, on the one hand, in bearings 50 and 50', respectively, which are retained by the winding shafts 2 and 2', respectively. These bearings 50 and 50' are formed with guide grooves in which the cam disc 17 is guided. The bearings 50 and 50' are axially movable with respect to the winding shafts 2 and 2'; and the winding shafts may rotate freely with respect to these bearings. In addition the cam disc 17 is supported at the upper end of a post 51 which carries a support plate 52 at its upper end for permanent support of the bottom side of the cam disc 17. One end of the tension spring 18 also is secured to the post 51.

As may be taken from FIG. 1A, the positive coupling between the sound head carrier 30 and the rotary plate 45 carrying the cam disc engaging fixture 33 for the cam disc 17 and the shift cam 44 for the rocker 40 includes "lost motion" obtained by an arcuate oblong hole 47 in cooperation with a coupling rod 34. The coupling rod 34 is connected firmly to the sound head carrier 30, while its lower end is guided in the oblong hole 47. When the sound head carrier 30 is pivoted inwardly from its backwardly swung position (FIG. 1A), the coupling rod 34 will not take along the rotary plate 45 whose fulcrum also is the pivot axis 31 until the coupling rod 34 has travelled all along the oblong hole 47.

With the sound head carrier 20 adjustment of the rocker 40 is not required, instead the rocker position is needed as determined by the spring 46. Therefore, only the cam disc 17 must be adjusted upon pivoting of the sound head carrier 20. To this end an engaging plate 24 is fixed on the pivot axis 21 approximately at the level of the cam disc 17 and coupled rigidly to the sound head carrier 20 by way of the engaging fixture 22. The cam disc engaging fixture 23 which will then displace the cam disc 17 is mounted to the bottom side of the engaging plate 24. As may be taken from the top plan view of FIG. 1A, the front edge of the engaging plate 24 connecting the engaging fixture 22 with the cam disc engaging fixture 23 is oblique (inclination 25). This serves the purpose of permitting the front edge of the sound head carrier 10 to pass the engaging plate 24 when the sound head carrier 20 is pivoted into position, involving the positive outward pivoting of the sound head carrier 10.

Reference is now made to FIG. 2 showing the sound head carrier 20 pivoted into position, the sound head carrier 10 being left out for purposes of clarity.

The sound head carrier 20 has been swung around the pivot axis 21 thus having moved the engaging plate 24 by way of the engaging fixture 22. This has caused the cam disc engaging fixture 23 to come to a stop at the cam disc 17 pressing the latter against the force of the spring 18 (FIG. 1A) into the position shown in FIG. 2A. Hereby the winding shafts 2 and 2' were forced to move toward each other, the engaging plates 7 and 7' being pivoted about the guide pins 8 and 8', respectively. The winding heads 3 and 3' with the engaging pins 4 and 4', on the other hand, have not changed their relative positions with respect to the winding shafts because the rocker 40 was not actuated.

Pivoting of the sound head carrier 20 here is effected by means of an electric motor 26 the driven shaft of which is connected to a lug formed at the sound head carrier 20 or the engaging plate 24 by means of two articulated connecting rods. As indicated by the two arrows at the connecting rod 28, the direction of rotation of the electric motor 26 is reversed for pivoting of the sound head carrier 20 into and out of its operating position. The position in space of the electric motor 26 with respect to the point of engagement of the connecting rod 29 at the sound head carrier 20 is so selected that the two connecting rods 28 and 29 will have a toggle lever effect in the range of the limit position. In this manner it is assured that the sound head carrier 20 is pressed into its operating position under a sufficiently strong force, the operating position being reached by a stop between the front end of the sound head carrier 20, i.e. the end remote from the pivot axis 21, and the pivot axis 31.

As already explained with reference to FIG. 1, the engaging fixture 22 takes along the sound head carrier 10 when the sound head carrier 20 is pivoted from the inoperative position (FIG. 1A) into the operative position (FIG. 2A), pivoting the sound head carrier 10 about the pivot axis 11 and thus out of its operative position against the force of the springs 13.

In the case of the embodiment shown, the operating position illustrated in FIG. 2 is suitable for the so-called microcassette. With this cassette the winding mandrel is a ring which carries the winding on the outside and has six dogs at the inside formed along the diameter. A recording and playback head 60 as well as an erasing head 61 are provided for this cassette. These two heads 60 and 61 are fixed on a carrier plate 62 which in turn is fixed on the sound head carrier 20 by means of a threaded pin 63 so as to move together with the same.

In addition two vertically upwardly protruding restraining pins 64 and 65 are fixed on the sound head carrier 20 to enter into corresponding openings of the micro-cassette.

Consequently the cassette must be pushed from above on the two restraining pins 64 and 65.

When the sound head carrier 20 is pivoted back from its operative position shown in FIG. 2A into its inoperative position (FIG. 1A) by the electric motor 26, the sound head carrier 10 is swung back by the springs 13 because the engaging fixture 22 releases the sound head carrier 10 when the sound head carrier 20 is swung back. A toggle lever effect between the two connecting rods 28 and 29 also is established in the inoperative pivot position of the sound head carrier 20 so that again a sufficiently strong force is available in order to move the sound head carrier 20 into an exactly defined limit position.

FIG. 3 shows the third operating position at which the sound head carrier 30 comes into effect. This third operating position is suitable for the so-called mini-cassette and the so-called mini-M-cassette. Both types of cassette differ only in the dimensions of length and width but not in respect of the spacing and design of the winding cores or as regards the position of the sound head. Also with these cassettes the winding mandrel is a ring which carries the winding on the outside and has six dogs at the inside protruding from the diameter. The inner diameter of this ring, however, is smaller than that of the micro-cassette. Furthermore, the spacing between the winding shafts of the mini-cassette and of the mini-M-cassettes is somewhat greater than in the case of the micro-cassette which has the smallest distance between winding shafts of all marketable cassettes.

Also with these cassettes again the sound head 35 (recording and playback head) as well as the erasing head 36 are arranged separately. Finally, these mini-cassettes also have recesses at their bottom side by means of which the cassette is held in cooperation with restraining pins 37 and 38. The two heads 35 and 36 and the restraining pins 37 and 38, therefore, are fixed on the sound head carrier 30 at a corresponding relationship with respect to each other. Also this sound head carrier 30 is moved by an electric motor 53, again by way of two articulated connecting rods 54 and 55 one of which is secured to a lug 56 of the sound head carrier 30, while the other one is fixed to the driven shaft of the electric motor 53. The two connecting rods 54 and 55 are interconnected by a joint 57. The arrangement of the articulated connecting rods and the motor again is so selected that a toggle lever effect is obtained in both limit positions. When the sound head carrier 30 is moved from the position shown in FIG. 1 into the operating position according to FIG. 3, first the downwardly projecting engaging fixture 32 mounted firmly on the sound head carrier 30 will contact the sound head carrier 10, pivoting the same out of the way. Upon further pivoting motion the coupling rod 34 firmly connected to the sound head carrier 30 travels through the arcuate oblong hole 47 until it comes to a stop at the end thereof and then takes along the rotary plate 45 upon further movement. This rotary plate 45 rests on the base plate 1 and its axis of rotation also is the pivot axis 31. Movement of the rotary plate 45 on the one hand moves the cam disc engaging fixture 33 and, on the other hand, the shift cam 44 which projects vertically from the rotary plate 45. The cam disc engaging fixture 33 displaces the cam disc 17, whereby the mutual spacing of the winding shafts is reduced.

The shift cam 44 tilts the rocker 40 by having a tongue 66 of the rocker 40 slide upwardly along the vertical inclined face 67 of the shift cam. In this manner the rocker 40 is tilted against the force of the spring 46 so that the winding shaft 2 is displaced upwardly while the winding head 3, at the same time, is displaced downwardly. Hereby only the winding shaft 2 with the groove and tongue joint 6 is effective for the winding drive of the cassette, while the engaging pins 4 at the winding head 3 are ineffective.

When the sound head carrier 30 again is pivoted out of its operating position, the tongue 66 will slide down along the inclined face 67, and the rocker 40 again is tilted by the spring 46 into the other position shown in FIGS. 1 and 2. During this return pivoting motion of the sound head carrier 30 the sound head carrier 10 again is swung upwardly by the springs 13.

Reference now will be made to FIG. 5 showing the support of the winding shaft 2 and the adjusting mechanism of the winding shaft and of the winding head 3.

At its upper end the vertical upright post 51 on the base plate 1 carries a spacing and guiding sleeve 70 to the upper and lower ends of which supporting plates 71 and 72 are fixed which extend parallel to the engaging plate 7. The guide pin 8 presenting an extension of the post 51 passes through the upper supporting plate 71 and constitutes a pivot bearing and, at the same time, a guide means for parallel displacement of the engaging plate 7. The sleeve 70 is not displaceable in axial direction of the post 51, but it may be pivoted about the common axis of the post 51 and of the guide pin 8, taking along the three plates 7, 71, and 72.

The two supporting plates 71 and 72 extend so as to be superposed over the belt pulley 16 and each support a pivot bearing 76 and 77 in which the winding shaft 2 is journalled. Of course, the belt pulley 16 is firmly connected for rotation together with the winding shaft 2, for example by the groove and tongue joint 6. The carrier plate 9 (cf. FIGS. 1 to 3) also is disposed between the two plates 7 and 70 and the guide pin 8 extends through a bore formed in this carrier plate 9. The lower pivot bearing 77 is formed with a circular groove in which the cam disc 17 is guided.

A slide pin 73 extending parallel to the post 51 is also guided in the spacing and guiding sleeve 70. This slide pin 73 consequently is axially displaceable and extends from the bottom to the top through the supporting plate 72, the sleeve 70, the supporting plate 71 up to the engaging plate 7 to which it is connected in a centering aperture. A collar 74 resting on the rocker 40 is provided at the lower end of the slide pin 73. A collar 75 also is provided at the lower end of the winding shaft 2 and engages the other end of the rocker 40.

Figure 5A:
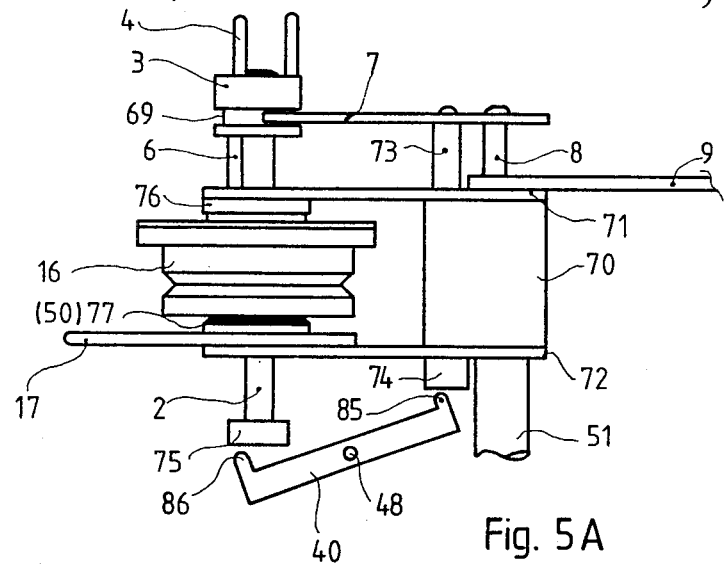
FIGS. 5A and 5B are diagrammatic side elevational views of the adjustable winding head used in the tape recorder according to the invention and shown in two different operating positions.
Figure 5B:
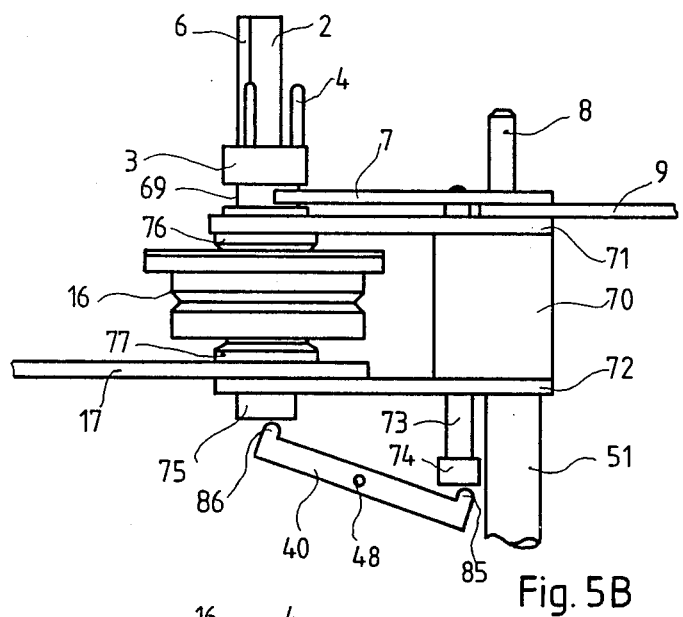
Figure 5C:
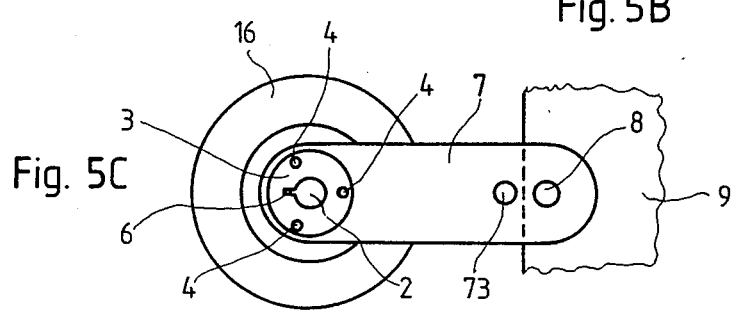
FIG. 5C is a top plan view of the winding heads shown in FIGS. 5A and 5B.

The spring 46 (FIG. 1B) has the effect that the rocker moves the slide pin 73 upwardly into the position shown in FIG. 5A. The slide pin 73 thereby pushes the engaging plate 7 in upward direction and the latter in turn presses the winding head 3 upwardly. For this purpose the engaging plate 7 is guided in a circular groove 69 formed at the outer periphery of the winding head 3. At this position of the rocker simultaneously the winding shaft 2 is lowered into its lower position.

At the other pivot position of the rocker 40 (FIG. 5B), on the other hand, the slide pin 73 is lowered and thus also the engaging plate 7 and the winding head 3, whereas the winding shaft 2 is pressed upwardly. It may also be recognized that the winding shaft 2 is axially displaceable with respect to the belt pulley 16.

Upon adjustment of the mutual spacing of the winding shafts 2 and 2' the latter, in the final analysis, are pivoted about the guide pin 8. Hereby, however, the distance of the winding shaft from the drive motor (not shown) or a driven plate (likewise not shown) is changed only so minutely that the (rubber) belt hereby practically is not elongated noticeably.

Figure 6:
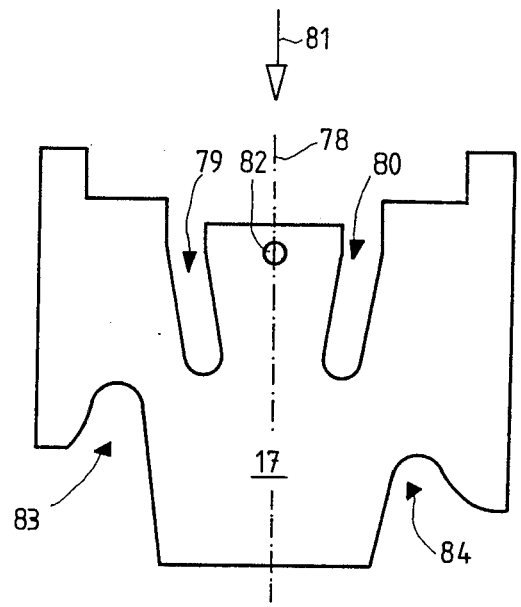
FIG. 6 is a top plan view of a control cam plate used according to the invention to vary the axial spacing between the winding shafts.
Figure 7A:
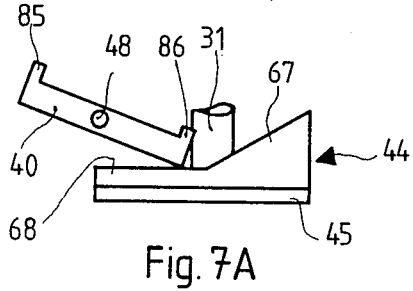
FIGS. 7A and 7B a diagrammatic side elevational view and top plan view, respectively, of a control cam and a rocker to adjust the winding heads shown in FIG. 5 in a first operating position.
Figure 7C:
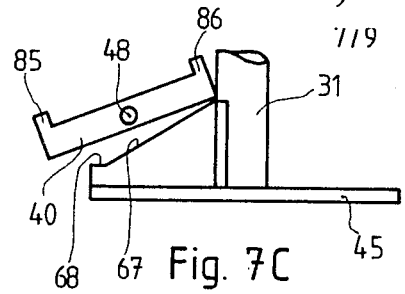
FIGS. 7C and 7D corresponding views of a second operating position.
Figure 7B:
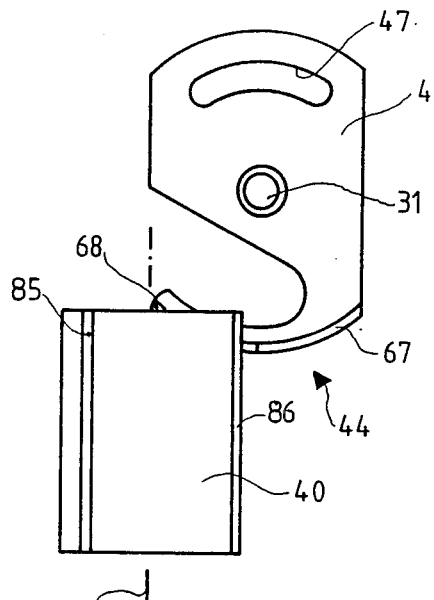
Figure 7D:
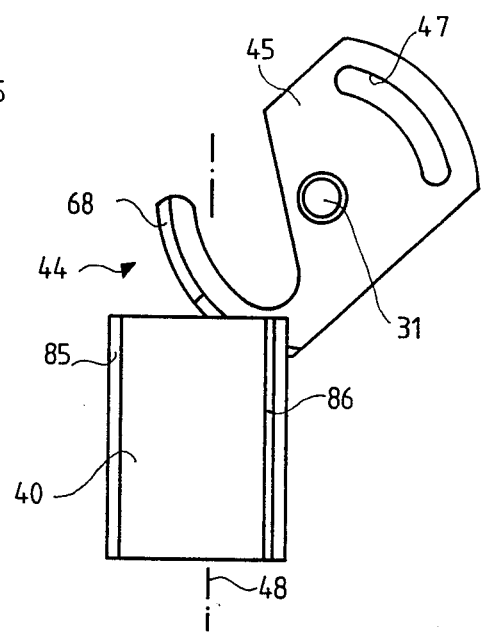

FIG. 6 shows a variant of the cam disc 17. It consists of a flat plate having two cutouts 79 and 80 which extend in mirror symmetry with respect to its central axis 78. The winding shaft 2 or, more specifically, the groove formed in the bearing 77 is guided along these cutouts. Starting from the outside and towards the inside the two cutouts 79 and 80 approach each other so that displacement of the cam disc 17 in the direction of the arrow 81 will move the two winding shafts 2 and 2' away from each other. In the area between the two cutouts 79 and 80 the cam disc 17 is formed with a bore 82 in which the spring 18 (FIG. 1A) is fastened. The spring pulls the cam disc 17 in the direction of the arrow 81.

Recesses 83 and 84 of different depths are formed in the cam disc 17 at the side remote from the open ends of the cutouts 79 and 80. The deepest location of these recesses 83 and 84 is of semicircular shape and engaged by the cam disc engaging fixtures 23 and 33, respectively. The cam disc engaging fixtures 23 and 33 act in a direction opposite to the elastic force of the spring 18 so that the cam disc 17 then is displaced contrary to the direction of the arrow 81, whereby the winding shafts are moved towards each other.

FIG. 7 is a more detailed illustration of the rocker 40 and the shift cam 44. The shift cam 44 is fixed on the rotary plate 45. It has two vertically upwardly projecting portions, one horizontal portion 68 and one contiguous rising portion having the inclined face 67. The rocker 40 is so arranged above the shift cam 44 that its lower edge or a scanning tongue (43 in FIG. 8) rests on the upwardly directed face of the shift cam 44. With the rocker 40 in the pivot position shown in FIG. 7A which corresponds to the pivot position shown in FIGS. 1, 2, and 5A, the lower edge of the rocker rests on the horizontal portion 68. The spring 46 not shown in FIG. 7 pulls the end of the rocker not resting on the shift cam in upward direction. If the rotary plate 45 is rotated about the pivot axis 31, the inclined face 67 will contact the bottom side and the rocker 40 tilts about the axis 48 into the position shown in FIGS. 7C and 7D.

In the embodiment according to FIG. 7 the rocker is U-shaped in cross section, having two vertically upwardly oriented legs 85 and 86. These legs are engaged respectively by the collars 74 and 75 (cf. FIG. 5).

Figure 8:
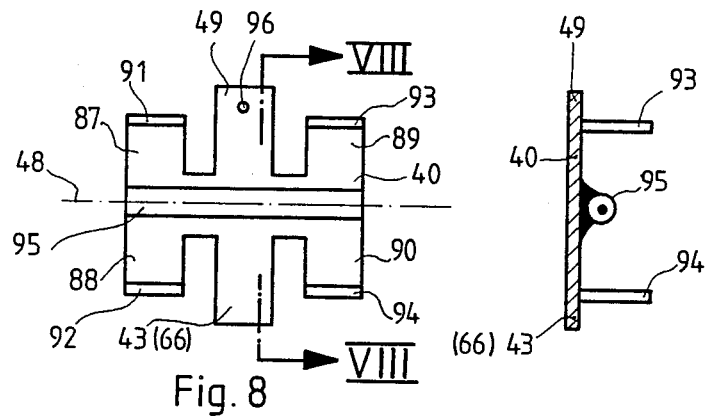
FIG. 8 a top plan view of another variant of a rocker for adjustment of the winding heads.

FIG. 8 is a top plan view and a sectional view along line VIII—VIII of another variant of a rocker 40 as shown for FIGS. 1 to 3. The rocker includes three pairs of arms 87, 88; 89, 90 disposed in mirror symmetry with respect to the rocker axis 48 and a scanning tongue 43 as well as an arm 49 disposed between the same. The spring 46 is fastened to a bore 96 formed in the latter. Here all these arms lie in one plane. Vertically upwardly projecting legs 91, 92, 93, 94 are mounted on the arms 87, 88, 89, and 90, and these legs are in contact respectively with the collar 74 or 75 of the two winding drives. A tubular bearing 95 is mounted on the rocker 40, for instance, by brazing. This bearing presents the pivot bearing of the rocker. As far as clarity permits, those parts of the rocker which are to be seen in FIGS. 1 to 3 are provided with the reference numerals according to FIG. 8.

Figure 4:
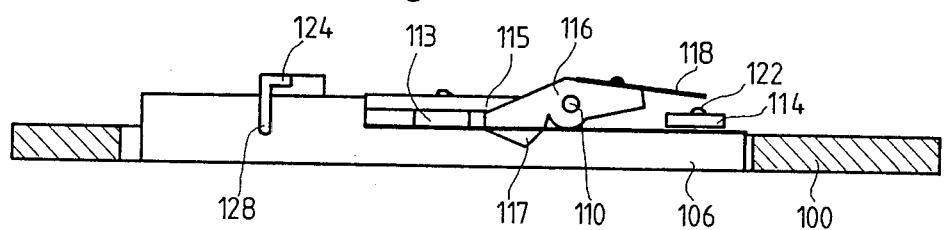
FIG. 4A is a diagrammatic sectional view of a cassette scanning device used in the cassette tape recorder according to the invention.
FIG. 4B is a plan view of the bottom side of the scanning means shown in FIG. 4A.
Figure 4:
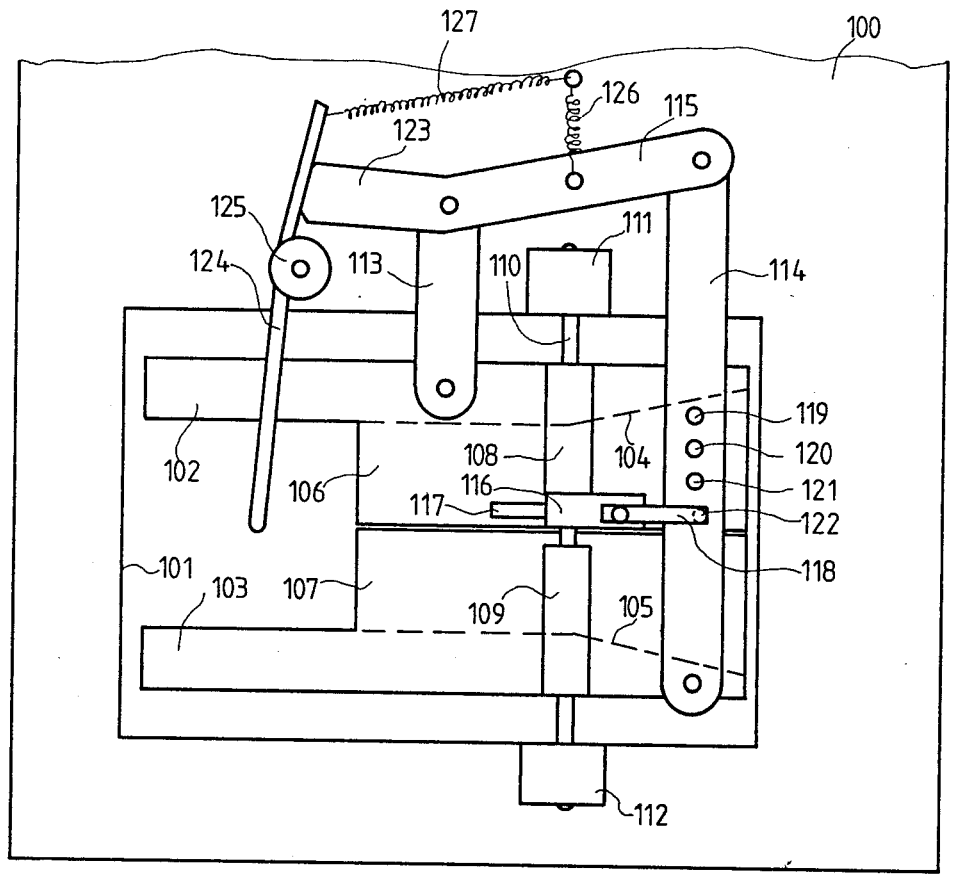

FIG. 4 shows the scanning means for the cassettes. This scanning means preferably is located in a housing cover 100 which has a rectangular recess 101 disposed above the winding shafts and the sound head carriers. Two scanning rails 102 and 103 extending parallel to each other and each having an inclined face 104 or 105 at its one end are received in this recess. Each scanning rail 102 and 103 is connected, preferably integrally, to a planar plate portion 106 and 107, respectively. The scanning rails 102 and 103 comprise guide sleeves 108 and 109 which extend transversely of their longitudinal extension and through which a guide rod 110 is passed. The guide rod is journalled at both ends of the recess 101 in bearings 111 and 112. The two scanning rails 102 and 103 and the associated plate portions 106 and 107, respectively, are interconnected by a parallelogram linkage 113, 114, and 115.

A pivotable switch contact arm 116 is supported on the guide rod 110 at the plate portion 106 and has its one leg 117 pass through the plate portion 106, while the opposite leg carries a contactor 118. A total of four electrical contacts 119, 120, 121, and 122 are arranged at the link 114 of the parallelogram linkage extending in parallel with the guide rod 110.

The link 115 of the parallelogram linkage extending substantially parallel to the scanning rails 102 and 103 includes a projecting extension 123 serving as a positive guide of a contact pressure arm 124 which is pivotably held in a pivot bearing 125.

The parallelogram linkage is biased by a spring 126 fastened to the arm 115 and the housing cover 100 such that the two scanning rails 102 and 103 are in their closest possible position with respect to each other. Furthermore, the contact pressure arm 124 is biased by a spring 127 such that its free end disposed in the recess 101 is pressed in a direction towards the respective sound head.

The mode of operation of the scanning means shown in FIG. 4 is as follows. The respective cassette is pushed into the recess 101 in the area of the faces 104, 105 from the bottom side in FIG. 4A or from the backside in FIG. 4B such that its broad bottom will come to lie on the plate portions 106 and 107 and its side surfaces against the inclined faces 104 and 105. Then the cassette is pushed forwardly, i.e. to the left in FIG. 4B. Hereby the scanning rails 102 and 103 are pushed apart in correspondence with the width of the cassette, the movements being antiparallel with respect to each other because of the parallelogram linkage 113, 114, 115. The scanning rails 102 and 103 are guided at the guide rail 110. As soon as the cassette has been pushed so far that it will no longer contact the inclined faces 104, 105 but instead the straight faces, the scanning rails 102 and 103 will be positioned at a spacing which corresponds to the width of the cassette. The bottom of the cassette then will press against the leg 117 of the switch contact arm 116 whereby the latter is pivoted and its contactor 118 will touch one of the switching contacts 119 to 122. In this manner the cassette is identified and one of the electric motors 26 or 53 will be controlled in response to the respective switching contact 119, 120, 121, or 122 which has been actuated. Hereby one of the operating conditions is adopted as shown in FIGS. 1, 2, or 3. The corresponding pivoting of one sound head carrier 10, 20, or 30 is carried out while the cassette is being pushed further forward. The cassette then will reach the part of the recess 101 which is no longer covered by the plate portions 106 and 107, thus entering the range of the winding shafts and sound head carriers. The cassette then may be inserted in correspondence with the respective type of cassette, a contact pressure leg 128 of the contact pressure arm 124 pushing the cassette in forward direction toward the sound head, thereby fixing its position.

The switching contact 122 which identifies the narrowest cassette, i.e. the mini-M-cassette consequently provides for switch-on of the motor 53. The switch contact 121 which identifies the micro-cassette switches on the motor 26. The switch contact 120 identifies the mini-cassette with which again the sound head carrier 30 is required so that this contact too activates the electric motor 53. The switch contacts 120 and 122 thus may be bridged or connected to each other.

The switch contact 119 finally identifies the so-called Grundig cassette with which the sound head carrier 10 is required so that none of the electric motors 26 or 53 must be actuated, provided the basic position prevails as shown in FIG. 1.

As long as no cassette has been inserted, the contactor 118 does not touch any of the switch contacts 119 to 122 so that a logic circuit may be used for control of both electric motors 26 and 53 such that they are moved into their inoperative position at which the sound head carriers 20 and 30 are pivoted out of position while the sound head carrier 10 is pivoted into a position of operation. An electrical switch may be provided in the area in front of the sound heads to be operated by the cassette and generate a signal indicating the presence of a cassette. In this manner it can be safeguarded that the electric motors are not actuated erroneously when a cassette has been introduced (into the frontmost position).

Control of the motors by the switch contacts 119 to 122 may be carried out such that the previous operating position always is maintained when a cassette is taken out. This has the advantage that the whole set of switching functions need not be carried out for each replacement of a cassette but only upon change of the type of cassette.

On the other hand, however, the control also may be such that after each withdrawal of a cassette the sound head carrier 20 or 30 which may have been pivoted into operating condition is swung out again and the tape recorder once more adopts the basic position shown in FIG. 1 at which the sound head carrier 10 is effective.

If the recorder is to be used primarily for a certain type of cassette, it is also possible to provide for one of the other positions to be the basic position which then will be adopted each time a cassette has been removed. This also may be programmed freely by the user.

Finally, it should be noted that the sound head carriers 10, 20, and 30 need not necessarily be associated with the types of cassette described in connection with the instant embodiment. All that has to be changed is the arrangement of the recording and/or erasing heads and any restraining pins as well as the shape of the control cam 17. Then it is also possible to provide as the basic condition according to FIG. 1 an arrangement for micro, mini, or mini-M-cassettes.

By the way, with the basic position as shown in FIG. 1 the upper front sides of the pivot axes 21 and 31 serve as cassette restraining pins because their mutual spacing is so selected that it exactly corresponds to the spacing between restraining openings in the bottom side of the Grundig cassette.

Instead of a drive by means of electric motors 26 or 53 it is also possible to provide a manually operated drive. For this purpose, for example, a lever might be provided to be operated by a user. It is also possible to provide corresponding lever connections at one of the links of the parallelogram linkage or at the scanning rails 102 or 103 to carry out the respective required pivoting of the sound head carriers when the two scanning rails 102 and 103 are being pushed apart.

Figure 9:
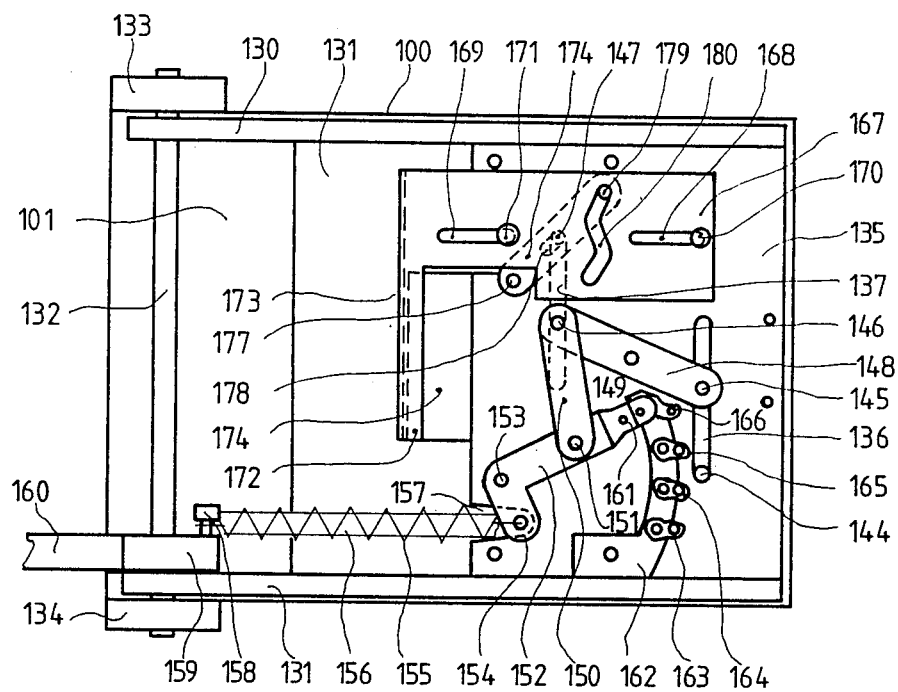
FIG. 9 a top plan view of the outwardly directed side of another variant of a cassette scanning device used with the cassette tape recorder according to the invention.
Figure 10:
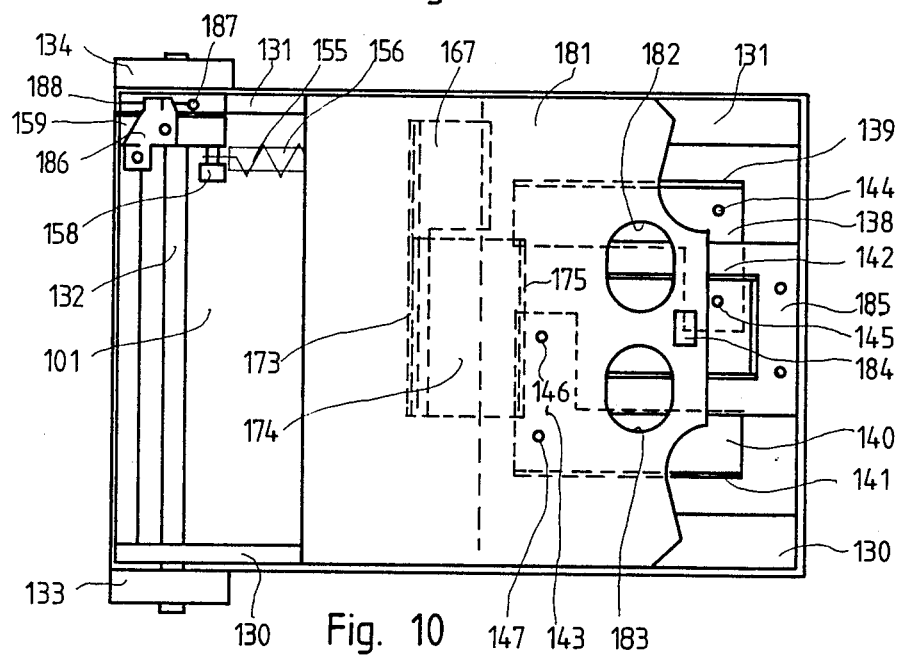
FIG. 10 a view of the inwardly directed side of the cassette scanning device shown in FIG. 9, i.e. of the side facing in the direction of the winding shafts and the sound heads.
Figure 11:
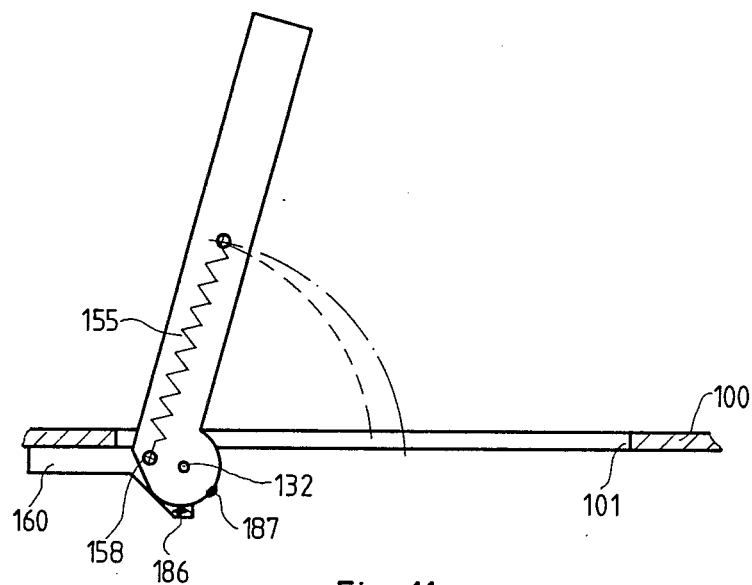
FIG. 11 a diagrammatic side elevational view of the cassette scanning device adapted to be swung open, including a "cassette compartment", as shown in FIGS. 9 and 10.

The various necessary pivoting or tilting motions also may be effected by means of racks or other mechanical couplings. FIGS. 9 to 11 show another variant of the scanning device.

The basic principle of this variant resides in the provision of a hinged cassette compartment into the front end of which the respective cassette is inserted. The movement occurring upon closing causes corresponding scanning members which scan the width of the cassette to become displaced. An electrical signal then is derived from the limit position thus reached. Furthermore, upon closing the position of the cassette is centered within the compartment and the cassette is aligned in the longitudinal direction of the compartment. Just before the compartment is completely closed, the sound head carriers are adjusted, as described above, and the winding drives as well. Clearly, this variant affords simpler operation by the user because the cassette onc it has been scanned need not be lifted again slightly in order to place it on the winding drive shafts.

First of all, reference is made to FIGS. 9 and 10. A recess 101 again is provided in the housing cover 100 (cf. also FIG. 4). The entire scanning means including the cassette compartment is arranged in this recess. This scanning means comprises two lateral pivot arms 130 and 131 which are pivotably mounted on a common axis 132 extending parallel to the plane of the cover 100. The axis 132 is supported in bearings 133 and 134 which are secured for rotation to the cover 100. Between them the two pivot arms 130 and 131 hold a carrier plate 135 at which all the individual components of the scanning means are fastened. The carrier plate 135 includes two parallel recesses 136 and 137 extending transversely of the longitudinal extension of the pivot arms 130 and 131 and being offset with respect to each other. These recesses 136 and 137 serve as guide means for two scanning carriers 138 and 140 which thus may be displaced toward and away from each other. The two scanning carriers 138 and 140 each include a scanning leg 139 and 141, respectively, projecting vertically into the interior of the tape recorder and corresponding in effect to the scanning rails 102 and 103 of FIG. 4. Both scanning carriers 138 and 140 are of Lshape design in the plane of the carrier plate 135 and thus each have a leg extending parallel to the pivot arms 130 and 131 and another leg 142 and 143, respectively,oriented in the direction of the other scanning carrier. The legs 142 and 143 each carry two spaced guide pins 144, 145 and 146, 147, respectively, guided in the recesses 136 and 137, respectively, of the carrier plate 135.

In this case too a linkage is provided to carry out corresponding parallel displacement in order that the scanning legs 139 and 141 may be moved when the cassette compartment is swung open and closed. Specifically, a pivot lever 148 is rotatably mounted in a pivot bearing 149 on the carrier plate 135, the pivot bearing 149 being disposed centrally between the two recesses 136 and 137. The guide pins 145 and 146 are fixed to the two respective ends of the pivot lever 148 in an oblong hole so that upon rotation of the pivot lever 148 about the axis of the pivot bearing 149 the two scanning carriers 138 and 140 are moved toward or away from each other. In this manner the opposed motions of the scanning carriers are obtained positively in combination with the provision of the recesses 136 and 137, a condition obtained with the embodiment of FIG. 4 by virtue of the parallelogram linkage.

A push-pull lever 150 is attached to one end of the pivot lever 148, in this case to the guide pin 146, while the other end is secured to a lever 152 by means of a pin 151. The lever 152 is of L-shape and fixed to the carrier plate 135 by means of a pivot bearing 153 at the bend of the "L". One arm 154 of the lever 152 is engaged by a tension spring 155 in the middle of which a rod 156 is supported so as to be freely movable. The carrier plate 135 is formed with a recess 157 in the connecting range between the spring 155 or the rod 156 and the arm 154 of the lever 152. The other end of the spring 155 is fastened to a spring retainer 158 which in turn is held by a thrust bearing 159 mounted on the axis 132 and fixed against rotation with respect to the housing cover 100 by means of a connecting arm 160.

As may be seen in FIG. 11, the spring retainer 158 is mounted eccentrically with respect to the axis 132 such that the spring 155 is tensioned when the cassette compartment is swung upwardly, while it is relieved when the compartment is pressed down. The rod 156 on the one hand engages the spring retainer 158 and, on the other hand, the arm 154 so that the lever 152 is rotated in counterclockwise sense (FIG. 9).

The other end of the lever 152 carries a wiping contact 161 which is insulated with respect to the lever 152 and to which an electrical lead is connected which is not shown.

Upon pivoting of the lever 152 the wiping contact 161 slides along a contact carrier 162 which is electrically insulated with respect to the carrier plate 135 and in the present case carries four spaced contacts 163, 164, 165, and 166 corresponding to the switch contacts 119 to 122 of FIG. 5. The contacts 163 to 166 also are connected to electrical leads (not shown) carrying corresponding scanning signals.

In the open position (FIG. 11) of the scanning means the spring 155 is relaxed and the rod 156 has pressed the lever 152 into the position shown in FIG. 9 so that both scanning legs 139 and 141 are at the greatest possible distance from each other. Now if the cassette compartment is pressed down, the spring 155 is tensioned, the lever 152 is rotated in clockwise sense, thereby pivoting the pivot lever 148 in counterclockwise sense (FIG. 9) by way of the push-pull lever 150, whereby the two scanning carriers 138 and 140 are moved towards each other. As soon as the scanning legs 139 and 141 touch the side walls of the cassette having been inserted, further motion is prohibited so that upon further closing of the cassette compartment only the spring 155 is tensioned. Thereupon the wiping contact 161 touches one of the contacts 163 to 166 depending on the width of the cassette and consequently on the type of cassette, whereby an electrical signal is generated to identify the respective type of cassette. Upon opening of the cassette compartment first of all the spring 155 is relieved, depending on the previous position, until the rod 156 presses against the arm 154 whereby the latter is rotated in counterclockwise sense (FIG. 9). Hereby finally the two scanning carriers 138 and 140 are moved away from each other.

As the various cassettes differ not only in width but also in length, care must be taken that the side to be sensed by the sound head always lies in the same plane. To this end another plate 167 is supported for displacement on the carrier plate 135 by means of pins 170 and 171 secured to the carrier plate 135. Recesses 168 and 169 formed in the plate 167 slide along the same. The recesses 168 and 169 are positioned parallel to the longitudinal extension of the pivot arms 130 and 131 so that the plate 167 is displaceable in this longitudinal direction and, therefore, transversely of or at right angles with respect to the direction of movement of the two scanning carriers 138 and 140.

The plate 167 projects beyond the carrier plate 135 in the direction of the axis 132. In this area the plate 167 is provided with a vertically projecting leg 172 located in the plane of the plate 167. A leg 173 projects vertically from the leg 172 and from the plate 167 in the direction toward the interior of the tape recorder. An engaging plate 174 is fixed on this leg 173 and it also has a leg 175 projecting vertically downwardly, i.e. toward the interior of the tape recorder. This leg 175 comes to touch the backside of the cassette and pushes the same toward the front, if desired, i.e. to the right in FIGS. 9 and 10.

When the cassette compartment is pivoted or the scanning carriers 138 and 140 are displaced, this causes positive displacement of the plate 167 and consequently also of the engaging plate 174. For this purpose a lever 176 is provided, in this case being arranged between the carrier plate 135 and the plate 167. One end of this lever is journalled in a pivot bearing 177 fixed to the carrier plate 135. Approximately in the middle of the lever 176 an oblong hole 178 is formed in which the guide pin 147 slides which is fixed to the scanning carrier 140 as well. The other end of the lever 176 carries a pin 179 sliding in a control cam 180 of the plate 167. The control cam 180 has a substantially S-shaped course and is so designed that as a result the leg 175 of the engaging plate 174 will adopt the correct position in correspondence with the type of cassette scanned so as to center the cassette with respect to the scanning heads and the winding shafts.

If the two scanning carriers 138 and 140 are moved towards each other, the scanning carrier 140 takes along the lever 176 by means of the guide pin 147, the lever thus being swung about the pivot bearing 177. Hereby the plate 167 and consequently the engaging plate 174 are displaced by cooperation of the pin 179 and the control cam 180. Thus the displacements of the scanning carriers 138, 140 and the plate 167 are positively coupled.

FIG. 10 further shows that the side of the carrier plate 135 from which the scanning legs 139 and 141 as well as the leg 175 project (bottom side) is covered by a cover plate 181. Thus the cover plate 181, the scanning legs 139, 141, the scanning carriers 138 and 140 as well as the carrier plate 135 define a cavity which presents the cassette compartment and is open at one side only.

The cover plate 181 is formed with two openings 182, 183 through which the winding heads project. Another opening 184 may be provided through which a sound shaft drive may extend.

A U-shaped guide plate 185 partly covering the scanning carriers 138 and 140 without obstructing their displacements is provided in order to prevent the backside of the cassette from hitting against the scanning carriers 138 and 140 upon being introduced, whereby the cassette might be jammed. As the individual types of cassettes also are of different height, a resilient tongue (not shown) is provided in the area of the guide plate 185 to press the cassettes against the cover plate 181 whereby also their position in height is fixed clearly.

Finally, it must also be assured that no electrical signal causing the pivoting of the sound head carriers in one of the positions according to FIGS. 1 to 3 is generated while the scanning carriers 138, 140 are being displaced, in other words at a time at which the scanning has not yet been completed and the cassette consequently has not yet been clearly identified. On the other hand, it must be assured that the winding shafts and the scanning heads have adopted the correct position prior to the complete closing of the cassette compartment. For this purpose an electrical contact 186 is provided at the thrust bearing 159 which is fixed against rotation, and this contact cooperates with another movable contact 187 mounted on the pivot arm 131. The relative position of the contacts 186 and 187 is so selected that contact is established at a predetermined angle before the complete closing of the cassette compartment. This then electrically releases the scanning of the contacts 163 to 166. If the contacts 186 and 187 on the one hand and the wiping contact 161 as well as the respective scanned one of the contacts 163 to 166 are regarded as being an electrical switch, it is convenient to connect the same in series so as to establish a logical AND conjunction. A signal identifying the cassette being scanned thus cannot be generated until the "switch" 186, 187 is closed.

The top side (FIG. 9) of the scanning device also is covered by a plate (not shown) which lies approximately in the plane of the top side of the housing cover plate 100 when the cassette compartment is closed.

The cassette compartment is held in closed position by a locking means (not shown), as is usual with cassette recorders having a cassette compartment.

Another locking means (not shown) may be provided in order to prevent the complete closing of the cassette compartment before the sound head carriers have been moved into the respective terminal positions. This locking means prevents the total closing of the cassette compartment and is not opened (e.g. electromagnetically) until the respective sound head carrier has reached its final operating position.

What is claimed is:

1. A cassette tape recorder operable for use with a plurality of cassettes having respective different geometric dimensions and respective different spacing of cassette winding drums, comprising two winding shafts (2, 2') movably disposed at variable spacing positions and each including adjustable engaging fixtures for engaging different types of winding drums of the cassettes, further comprising at least one electromagnetic sound head disposed on a carrier which is movably positionable with respect to the winding shafts, characterized in that the at last one sound head (14, 35, 60) is movable into either of two predetermined limit positions, in that a scanning member (102, 103, 118-122; 139, 141, 161-166) is provided to scan a geometric dimension of the respective cassette, and means responsive to said scanning member for moving said winding shafts' spacing positions, and for adjusting said engaging fixtures, and for movably positioning said carrier.

2. The tape recorder as claimed in claim 1 characterized in that the sound heads (14, 35, 60) and associated erasing heads (36, 61), if any, each are supported by a sound head carrier (10, 20, 30) of their own and each sound head carrier (10, 20, 30) respectively is adapted to be moved into an operating position by said means responsive to said scanning member.

3. The tape recorder as claimed in claim 2, characterized in that the sound head carriers (10, 20, 30) are movably supported on pivot axes (11, 21, 31).

4. The tape recorder as claimed in claim 3, characterized in that one (11) of the pivot axes is disposed in parallel with a base plate (1), while another pivot axis (21, 31) is upright on the base plate and spaced from said one pivot axis.

5. The tape recorder as claimed in claim 1, characterized in that the winding shafts (2, 2') are positively guided along a displaceable cam disc (17), and in that the shifting position of the cam disc (17) is determined by the position of the sound head carriers (10, 20, 30).

6. The tape recorder as claimed in claim 5, further comprising cam disc engaging fixtures (23, 33) coupled to the sound head carriers (20, 30) to shift the cam disc (17) upon pivoting of the sound head carriers.

7. The tape recorder as claimed in claim 1, characterized in that the winding shafts (2, 2') are held by supporting plates (7, 71, 72) which are pivotable about guide pins (8, 8') extending parallel to the winding shaft axis, the winding shafts being movable along a circular arc the radius of which corresponds approximately to the distance of the winding shaft axis from a drive belt pulley of a belt drive.

8. The tape recorder as claimed in claim 1, further comprising winding heads (3, 3') displaceable in axial direction on the winding shaft (2, 2') but fixed for rotation by a groove and tongue joint (6) on the winding shafts (2, 2'), and in that the winding heds (3, 3') include axially protruding engaging pins (4, 4') which extend axially beyond the end of the winding shafts (2, 2') in one position of the winding heads (3, 3'), whereas ends of the winding shafts (2, 2') extend beyond the engaging pins (4, 4') in another position of the winding heads.

9. The tape recorder as claimed in claim 8, characterized in that the relative displacement between the winding heads (3, 3') and the winding shafts (2, 2') is effected by a rocker (40) which is tiltable about an axis (48) disposed at right angles with respect to the winding shafts (2, 2') and one end of which is adapted to be moved into contact with the lower end of the winding shaft (2,2') while the other end is coupled with the winding head (3) by way of a slide pin (73) and the supporting plate (7), the rocker (40) being tiltable between two limit positions by a shift cam (44) upon movement of the latter in response to the movement of one of the sound head carriers (30).

10. The tape recorder as claimed in claim 9, characterized in that at least some of the sound head carriers (20, 30) are pivotable by means of electric motors (26, 35) which are coupled with the sound head carriers (20, 30) by links (28, 29; 54, 55) such that a toggle lever effect is obtained at least in one limit position.

11. The tape recorder as claimed in claim 1, characterized in that the scanning member comprises two parallel displaceable scanning rails (102, 103; 139, 141) which are coupled by links (113, 114, 115; 148), and in that electrical means (118-122; 161-166) generate a signal which indicates the mutual position of the scanning rails (102, 103; 139, 141).

12. The tape recorder as claimed in claim 11, characterized in that an electrical contactor (118) is displaceable together with one of the scanning rails (102,103), and in that electrical contacts (119-122) are disposed along one (114) of the links (parallelogram linkage 113,114,115).

13. The tape recorder as claimed in claim 12, characterized in that the contactor (118) is fixed to a pivotable switch contact arm (116) which is tilted into a contacting position between the contactor (118) and the switching contacts (119-122) by insertion of a cassette.

14. The tape recorder as claimed in claim 13, characterized in that the electric motors (26, 53) are controlled by the contacts (119-122) through the intermission of a control logic, if desired.

15. The tape recorder as claimed in claim 11, characterized in that the scanning rails (139,141) are disposed in a pivotable cassette compartment, and in that the scanning rails (139,141) are displaceable by spring force (spring 155) upon pivoting of the cassette compartment.

16. The tape recorder as claimed in claim 15, characterized in that the two scanning rails are guided for displacement in parallel recesses (136,137) formed in a carrier plate (135), in that both scanning rails are displaceable by a rocking lever (148) which is pivotably supported at the carrier plate (135) and movable by the spring (155) by means of a linkage (150,152).

17. The tape recorder as claimed in claim 16, characterized in that an electrical switch contact (161) is provided which is movable together with the scanning rails along a contact carrier (162) carrying a plurality of contacts (163,164,165,166).

18. The tape recorder as claimed in claim 17, characterized in that a lever (152) of the linkage actuating the rocking lever (148) carries the switch contact (161) at its one end and is of L-shaped design and connected to the spring (155) by its arm (154) which is remote from the switch contact (161).

19. The tape recorder as claim 18, characterized in that a rigid rod (156) is supported within the spring (155) and has one end at a spring retainer (158) which is connected rigidly to a housing cover (100) and the other end in the area of the arm (154), the length of this rod (156) being so selected that it presses against the arm (154) beginning at a certain pivot position of the cassette compartment and swings the arm in closing direction of the cassette compartment upon further pivoting.

20. The tape recorder as claimed in claim 19, characterized in that the spring retainer (158) is arranged offset in height or eccetrically with respect to a pivot axis (132) of the cassette compartment so that a change in length of the spring (155) occurs upon pivoting of the cassette compartment about this axis (132).

21. The tape recorder as claimed in claim 20, characterized in that an electrical switch contact (186, 187) is arranged in the range of the pivot axis (132), said switch contact (186, 187) being closed from a predetermined closing position on and being positioned in a logical AND in conjunction with the switch formed by the swith contact (161) and the coordinated contacts (163–166).

22. The tape recorder as claimed in claim 21, characterized in that a contact pressure member (174, 175) is provided which is positively coupled to the scanning rails (139, 141) and displaceable at right angles with respect to the direction of displacement of the scanning rails and has a contact pressure leg (175) by which it presses against the backside of the cassette thus determining the alignment of the cassette with respect to the winding heads and winding shafts.

23. The tape recorder as claimed in claim 22, characterized in that the positive coupling is effected by a link (176) and a control cam (180) as well as a plate (167) connected to the contact pressure member (174,175).

24. A cassette tape recorder operable for use with a plurality of types of cassettes each having respective different geometric dimensions and respective different spacings of cassette winding drums and respective different dimensions of winding mandrels and respective different sound head positioning requirements; comprising two winding shafts pivotally mounted to provide variable spacing thereetween; engaging fixtures with means for controllably positioning the spacing of said two winding shafts; a plurality of sound head carriers movably positionable relative to said winding drums; an adjustable winding head mounted to each of said winding shafts and means for controlling the adjustable winding heads for engagement with respective different cassette winding mandrels of different dimensions; means for receiving a cassette including a scanning member having means for sensing a geometric dimension of said cassette, and means for positioning said engaging fixtures, said sound head carriers, and said means for controlling the adjustable winding heads in response to said sensed geometric dimension; whereby to adapt said tape recorder for operable use with said received cassette.

* * * * *